United States Patent
Rodriguez

(10) Patent No.: US 12,352,084 B2
(45) Date of Patent: Jul. 8, 2025

(54) CAMPER SHELL LOCK ASSEMBLY

(71) Applicant: Jose Rodriguez, Caldwell, ID (US)

(72) Inventor: Jose Rodriguez, Caldwell, ID (US)

( * ) Notice: Subject to any disclaimer, the term of this patent is extended or adjusted under 35 U.S.C. 154(b) by 391 days.

(21) Appl. No.: 17/988,311

(22) Filed: Nov. 16, 2022

(65) Prior Publication Data
US 2024/0159089 A1    May 16, 2024

(51) Int. Cl.
*E05B 85/02* (2014.01)
*E05C 9/04* (2006.01)
*E05C 19/18* (2006.01)

(52) U.S. Cl.
CPC ............. *E05C 19/18* (2013.01); *E05B 85/02* (2013.01); *E05C 9/048* (2013.01)

(58) Field of Classification Search
CPC ... B60J 7/1607; B60J 7/19; B60J 7/194; B60J 7/198; B62D 33/04; E05C 19/18; E05C 9/048; E05B 77/44; E05B 83/00; E05B 83/44; E05B 85/02; E05B 13/004; E05B 17/2003; E05B 9/00; E05B 9/02; E05B 2009/046; Y10T 292/62; Y10T 292/79; Y10T 292/0834; Y10T 292/0848
USPC ....... 292/359, 346, 337, 7; 296/156, 100.02, 296/136.03, 136.06
See application file for complete search history.

(56) References Cited

U.S. PATENT DOCUMENTS

| | | | |
|---|---|---|---|
| 4,898,408 A | 2/1990 | Hauber | |
| 5,072,978 A * | 12/1991 | Woodward | E05B 13/004 70/416 |
| 5,150,934 A * | 9/1992 | Grody | E05C 19/18 292/288 |
| 5,154,459 A | 10/1992 | Cochran | |
| 5,738,397 A * | 4/1998 | Grody | E05C 19/18 292/DIG. 43 |
| 6,422,618 B1 * | 7/2002 | Guldner | E05B 13/004 292/DIG. 43 |
| 6,622,533 B1 * | 9/2003 | Santini | E05B 67/38 70/56 |
| D638,773 S | 5/2011 | Laverack | |
| 2017/0259654 A1 * | 9/2017 | McDonald, II | E05B 47/0001 |
| 2017/0335561 A1 * | 11/2017 | Wickramasekera | B60P 3/34 |

FOREIGN PATENT DOCUMENTS

CA            1296596            3/1992

* cited by examiner

*Primary Examiner* — Amy R Weisberg
*Assistant Examiner* — Wenwei Zhuo

(57) ABSTRACT

A camper shell lock assembly includes a camper shell that is installed on a bed of a pickup. The camper shell has a door and the door has a locking mechanism that is movably integrated into the door. The locking mechanism is rotatable into a locked condition for inhibiting the door from is opened. The locking mechanism is rotatable into an unlocked condition to facilitate the door to be opened. A box is positionable over the locking mechanism thereby restricting motion of the locking mechanism. The box is comprised of a rigid material thereby facilitating the box to inhibit the locking mechanism from being rotated into the unlocked condition. In this way the door from is inhibited from being opened to inhibit a person outside of the camper shell from opening the door.

7 Claims, 6 Drawing Sheets

CAMPER SHELL LOCK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to camper shell devices and more particularly pertains to a new camper shell device for locking a door on a camper shell. The device includes a box with a pair of slots and the box is positionable over a locking mechanism integrated into the door such that rods of the locking mechanism are positioned in a respective slot. The box inhibits a handle on the locking mechanism from rotating thereby inhibiting the locking mechanism from being unlocked from outside of the camper shell.

(2) Description of Related Art Including Information Disclosed Under 37 CFR 1.97 and 1.98

The prior art relates to camper shell devices including a camper shell latch that includes an interior handle that can be latched or unlatched regardless of whether an outside handle is locked or unlocked. The prior art discloses an inside lock for a camper shell than includes a keyed handle that can be locked to inhibit a door on the camper shell from being opened from outside. The prior art discloses a camper shell latch for locking a camper shell to a bed of a pickup. The prior art discloses a camper shell lock that is attachable to an existing latch mechanism of a door on a camper shell which includes a rigid body that extends downwardly from the door regardless of the position of the existing latch mechanism to inhibit the door from swinging open. The prior art discloses a retrofit lock device that includes a cam that is attachable to an existing handle of a latching mechanism of a camper shell to inhibit a door of the camper shell from being opened.

BRIEF SUMMARY OF THE INVENTION

An embodiment of the disclosure meets the needs presented above by generally comprising a camper shell that is installed on a bed of a pickup. The camper shell has a door and the door has a locking mechanism that is movably integrated into the door. The locking mechanism is rotatable into a locked condition for inhibiting the door from is opened. The locking mechanism is rotatable into an unlocked condition to facilitate the door to be opened. A box is positionable over the locking mechanism thereby restricting motion of the locking mechanism. The box is comprised of a rigid material thereby facilitating the box to inhibit the locking mechanism from being rotated into the unlocked condition. In this way the door from is inhibited from being opened to inhibit a person outside of the camper shell from opening the door.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
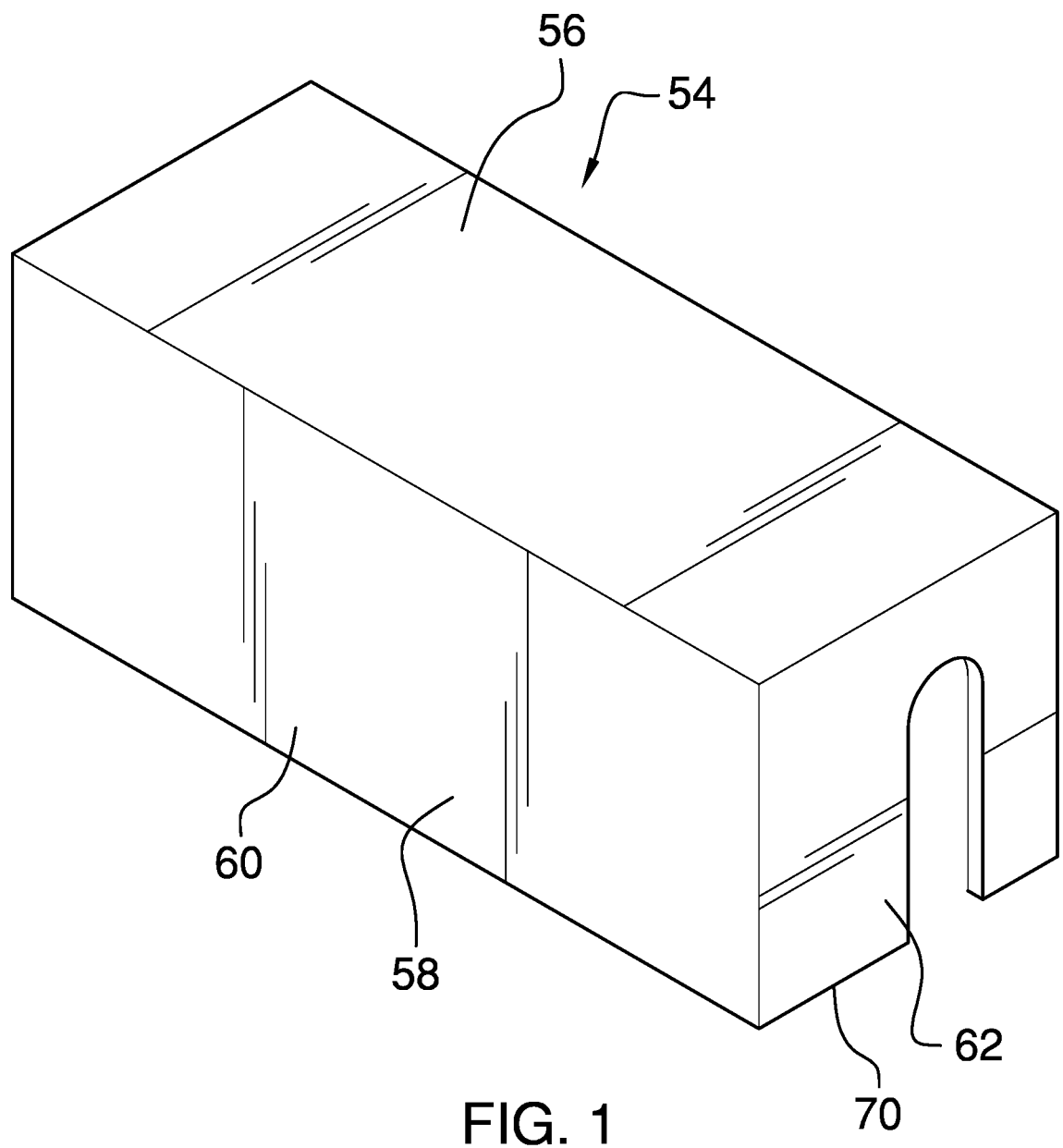
FIG. 1 is a top perspective view of a box of an embodiment of the disclosure.
Figure 2:
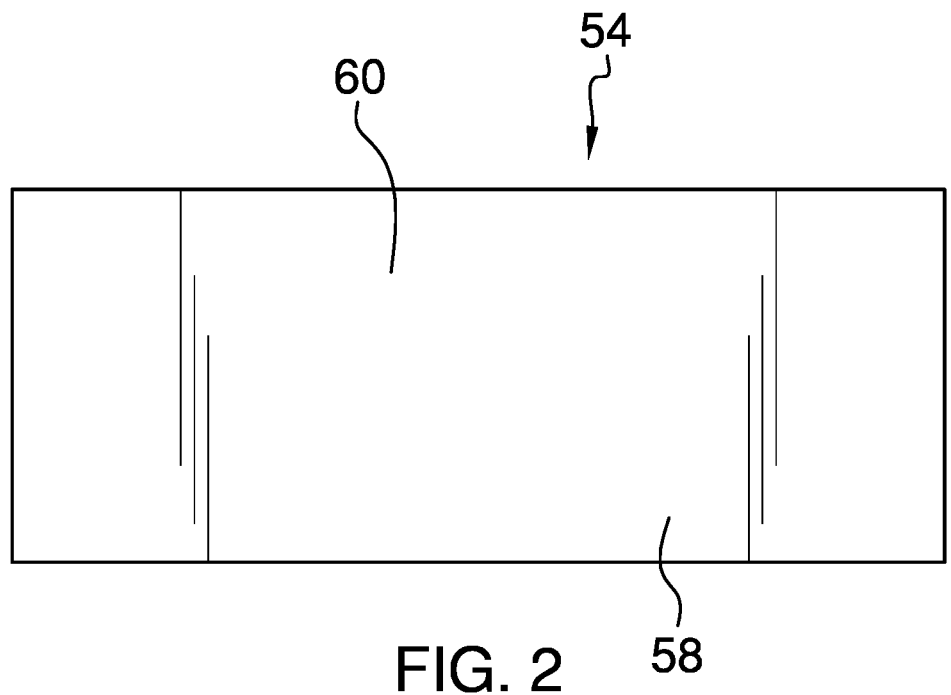
FIG. 2 is a front view of a box of an embodiment of the disclosure.
Figure 3:
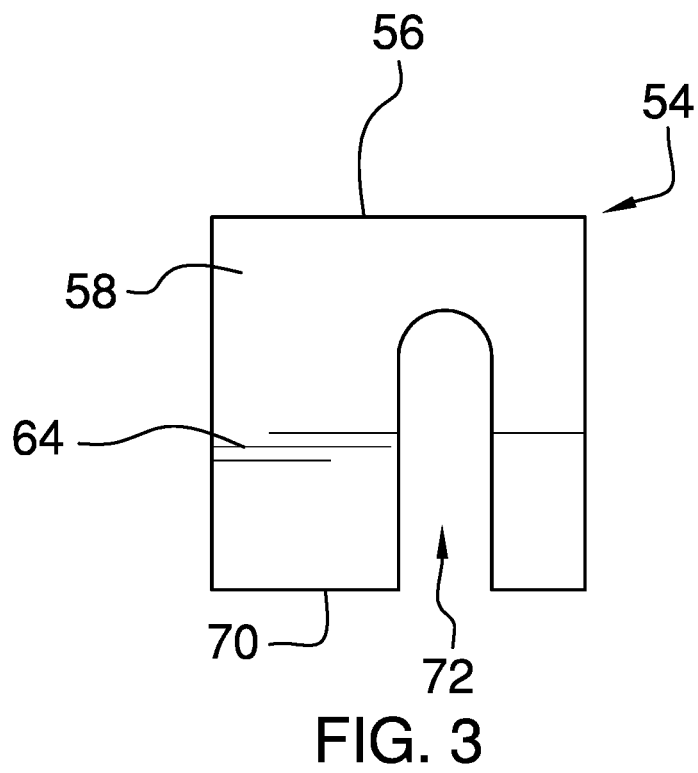
FIG. 3 is a left side view of a box of an embodiment of the disclosure.
Figure 4:
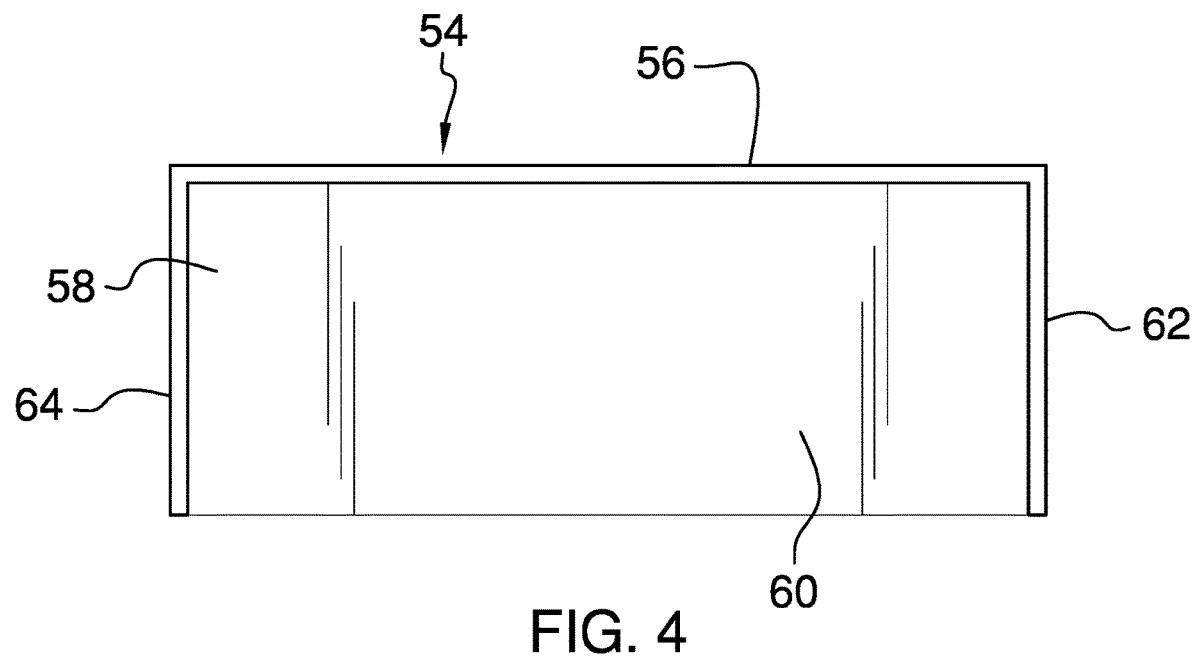
FIG. 4 is a back view of a box of an embodiment of the disclosure.
Figure 5:
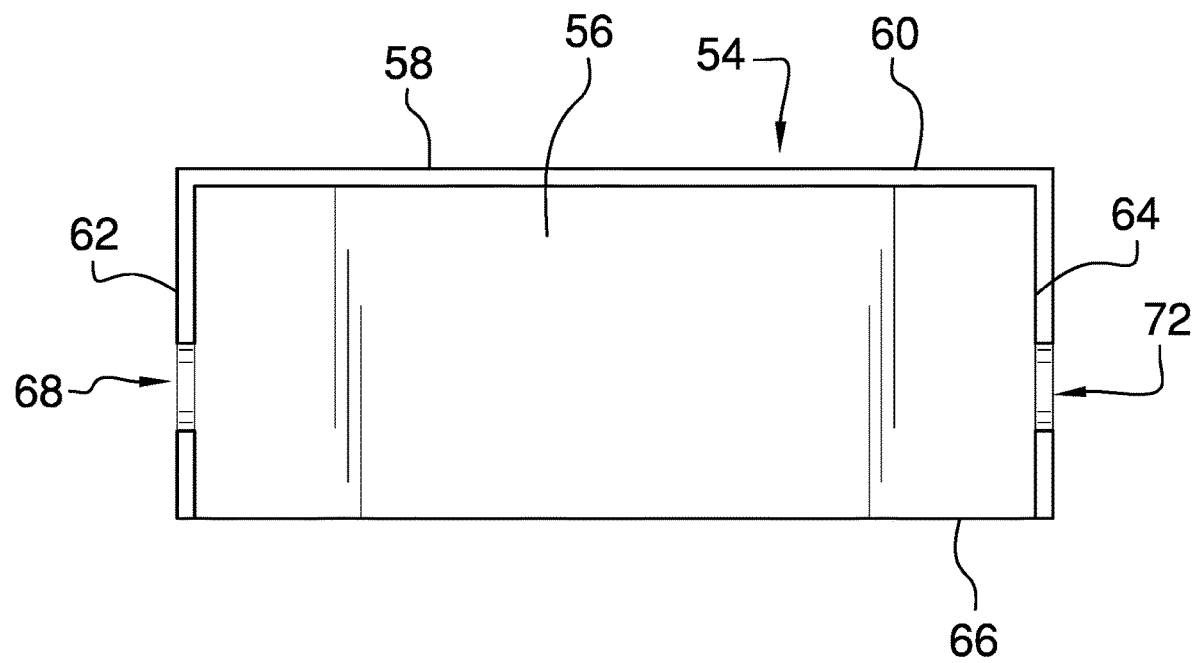
FIG. 5 is a bottom view of a box of an embodiment of the disclosure.
Figure 6:
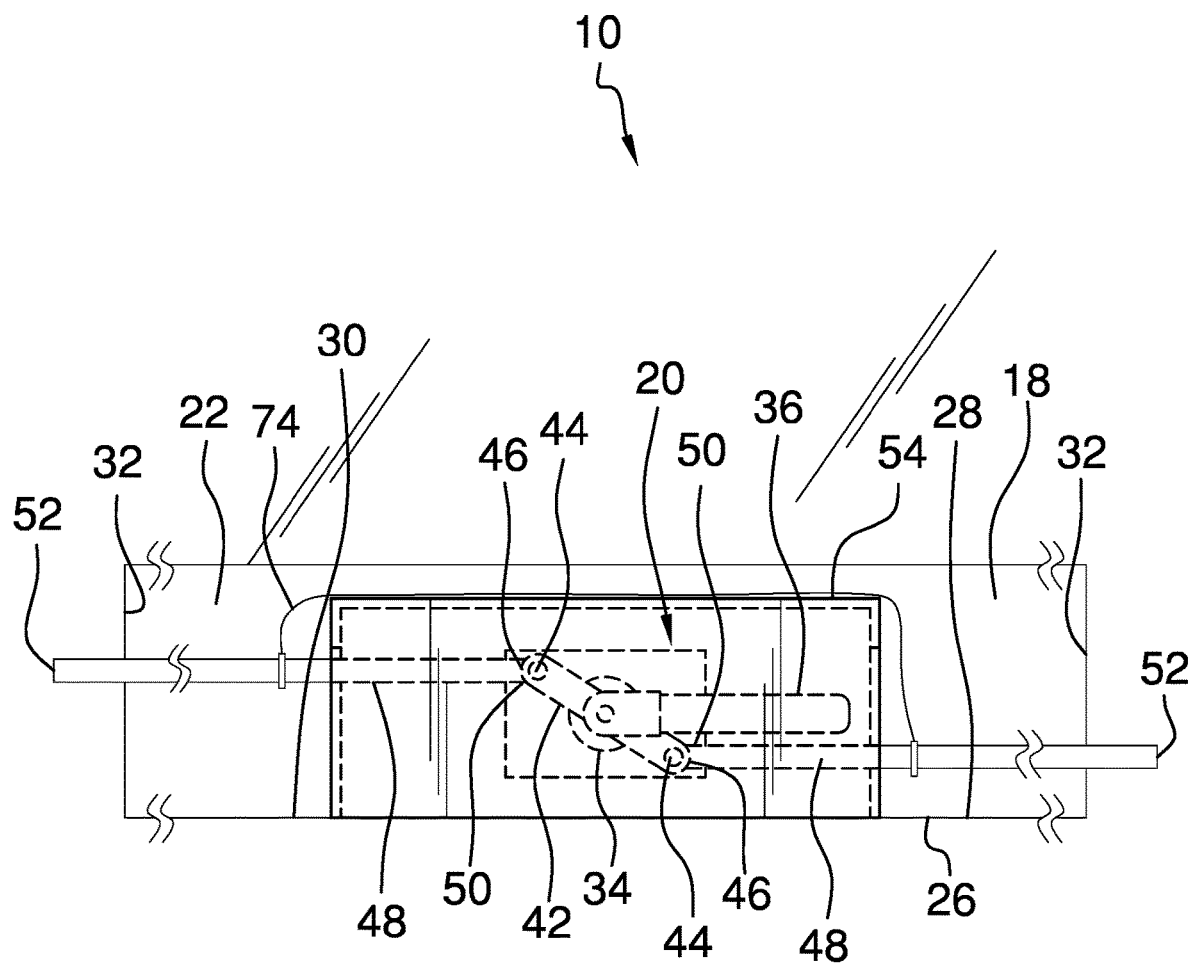
FIG. 6 is a phantom in-use view of a camper shell lock assembly according to an embodiment of the disclosure.

With reference now to the drawings, and in particular to FIGS. 1 through 8 thereof, a new camper shell device embodying the principles and concepts of an embodiment of the disclosure and generally designated by the reference numeral 10 will be described.

As best illustrated in FIGS. 1 through 8, the camper shell lock assembly 10 generally comprises a camper shell 12 that is installed on a bed 14 of a pickup 16. The camper shell 12 has a door 18 and the door 18 has a locking mechanism 20 that is movably integrated into the door 18. The door 18 has a front side 22, a rear side 24 and a lower edge 26 extending between the front side 22 and the rear side 24. Furthermore, the lower edge 26 rests upon a top edge 28 of a tailgate 30 of the bed 14 of the pickup 16 when the door 18 is in a closed position. The locking mechanism 20 is rotatable into a locked condition for inhibiting the door 18 from being opened and the locking mechanism 20 is rotatable into an unlocked condition to facilitate the door 18 to be opened. The camper shell 12 has a rear wall 32 and the door 18 is hingedly disposed on the rear wall 32. Additionally, the camper shell 12 may comprise a pickup topper of any conventional design and the pickup 16 may be a pickup of any conventional design that is commonly driven on public roadways.

The locking mechanism 20 includes a pivot 34 that is attached to the front side 22 of the door 18 and the pivot 34 is aligned with the lower edge 26 of the door 18. The locking mechanism 20 includes an interior handle 36 that is rotatably coupled to the pivot 34 thereby facilitating the interior handle 36 to be gripped by an occupant 38 of the camper shell 12 for urging the locking mechanism 20 between the locked condition and the unlocked condition. The interior handle 36 is oriented to extend upwardly with respect to the door 18 when the locking mechanism 20 is urged into the unlocked condition. Conversely, the interior handle 36 is oriented to extend laterally with respect to the door 18 when the locking mechanism 20 is urged into the locked condition.

The locking mechanism 20 includes an exterior handle 40 that is pivotally attached to rear side 24 of the door 18. The exterior handle 40 is in mechanical communication with the pivot 34 thereby facilitating the exterior handle 40 to urge the locking mechanism 20 between the locked condition and the unlocked condition. The locking mechanism 20 includes a cam 42 that is attached to the pivot 34 such that the cam 42 is rotated when the pivot 34 is rotated. The cam 42 has a pair of attachment points 44 that is each positioned on opposing ends 46 of the cam 42 with respect to each other.

The locking mechanism 20 includes a pair of rods 48 and each of the rods 48 has a connected end 50 and a free end 52. The connected end 50 of each of the rods 48 is pivotally attached to a respective one of the attachment points 44 on the cam 42. Each of the rods 48 extends along the front side 22 of the door 18 in opposite directions from each other. Furthermore, the connected end 50 of each of the rods 48 is urged toward each other when the locking mechanism 20 is rotated into the unlocked condition. In this way the free end 52 of each of the rods 48 is displaced from the rear wall 32 of the camper shell 12 thereby facilitating the door 18 to be opened. Conversely, the connected end 50 of each of the rods 48 is urged away from each other when the locking mechanism 20 is rotated into the locked condition. In this way the free end 52 of each of the rods 48 extends past the rear wall 32 of the camper shell 12 thereby inhibiting the door 18 from being opened.

A box 54 is provided and the box 54 is positionable over the locking mechanism thereby restricting motion of the locking mechanism 20. The box 54 is comprised of a rigid material, including but not being limited to plastic or metal, thereby facilitating the box 54 to inhibit the locking mechanism 20 from being rotated into the unlocked condition. In this way the door 18 from is inhibited from being opened thereby inhibiting a person outside of the camper shell 12 from opening the door 18. Thus, the occupant 38 of the camper shell 12 is protected from unwanted intrusion that could potentially result in theft or assault.

The box 54 has a top wall 56 and an outer wall 58 extending downwardly from the top wall 56 and the outer wall 58 has a front side 60, a first lateral side 62 and a second lateral side 64; a back side 66 of the box 54 is open. The first lateral side 62 has a first rod slot 68 extending from a bottom edge 70 of the first lateral side 62 toward the top wall 56 and the first rod slot 68 is positioned closer to the back side 66 of the box 54 than the front side 22 of the outer wall 58. The second lateral side 64 has a second rod slot 72 extending from the bottom edge 70 of the second lateral side 64 toward the top wall 56 and the second rod slot 72 is positioned closer to the back side 66 of the box 54 than the front side 22 of the outer wall 58. Each of the first rod slot 68 and the second rod slot 72 insertably receives a respective one of the rods 48 of the locking mechanism 20 when the box 54 is positioned over the locking mechanism 20 having the back side 66 of the box 54 accommodating the pivot 34 and the cam 42. The interior handle 36 abuts the top wall 56 of the box 54 when the exterior handle 40 is manipulated in the attempt to urge the locking mechanism 20 into the unlocked condition. In this way the locking mechanism is inhibited from being urged into the unlocked condition thereby inhibiting a person outside of the camper shell 12 from opening the door 18.

A securing element 74 is provided and the securing element 74 is attachable between the pair of rods 48 and the box 54 when the box 54 is positioned on the rods 48. In this way the box 54 is inhibited from being lifted upwardly from the rods 48. The securing element 74 may comprise a pair of hooks that each extends downwardly from the box 54 to engage a respective one of the rods 48. Furthermore, the securing element 74 may comprise a string that is tied around the box 54 and each of the rods 48. The securing element 74 may comprise any releasable mechanism that can engage the rods 48 to inhibit the box 54 from being lifted by the interior handle 36 in the event that the exterior handle 40 is manipulated in an attempt to unlock the door 18. The box 54 may have a length of approximately 13.0 cm, a depth of approximately 5.0 cm and a width of approximately 5.0 cm. Furthermore, each of the first rod slot 68 and the second rod slot 72 may be spaced a distance of approximately 1.5 cm from the back side 66 of the box 54.

Figure 7:
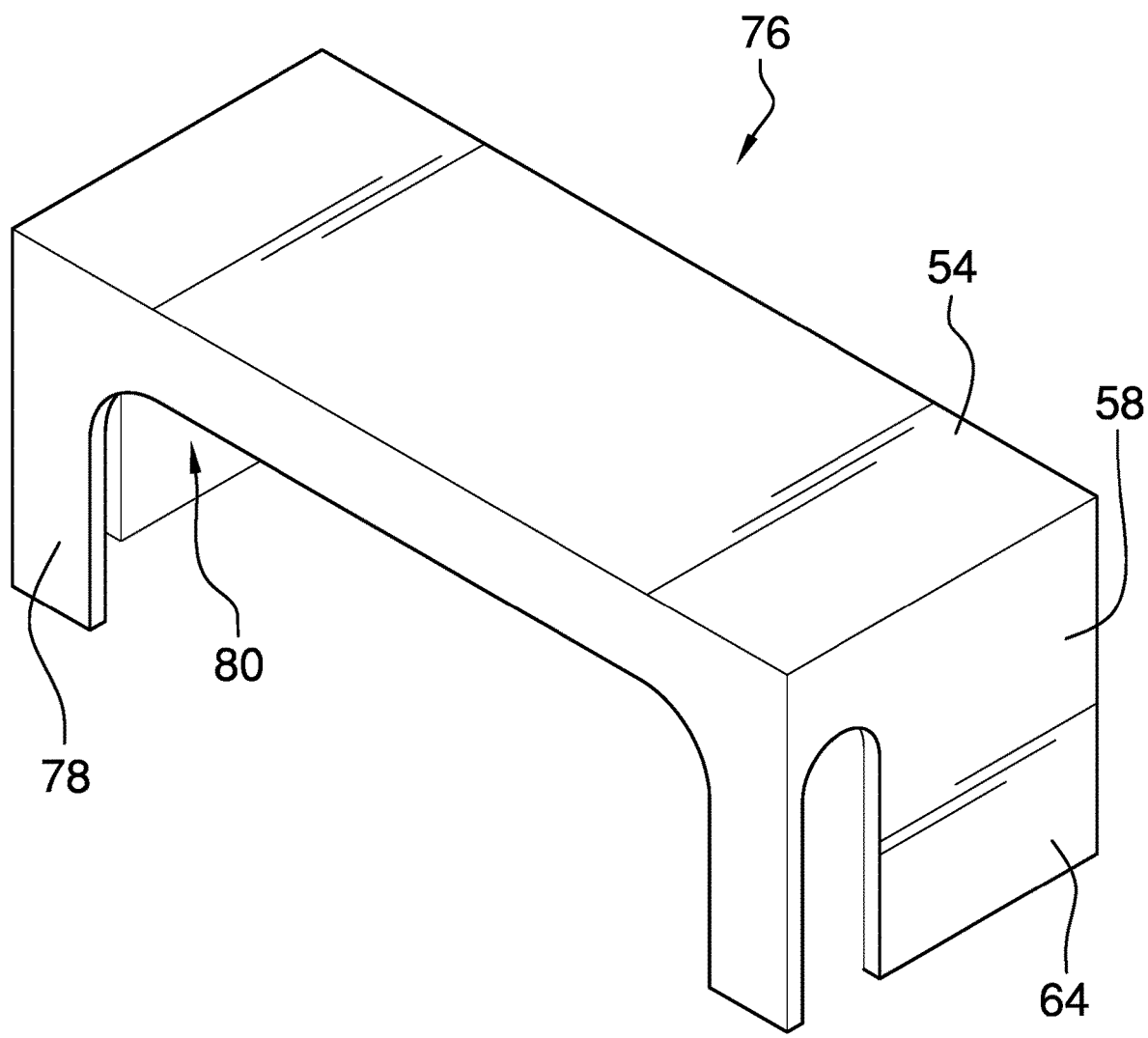
FIG. 7 is a perspective view of an alternative embodiment of the disclosure.
Figure 8:
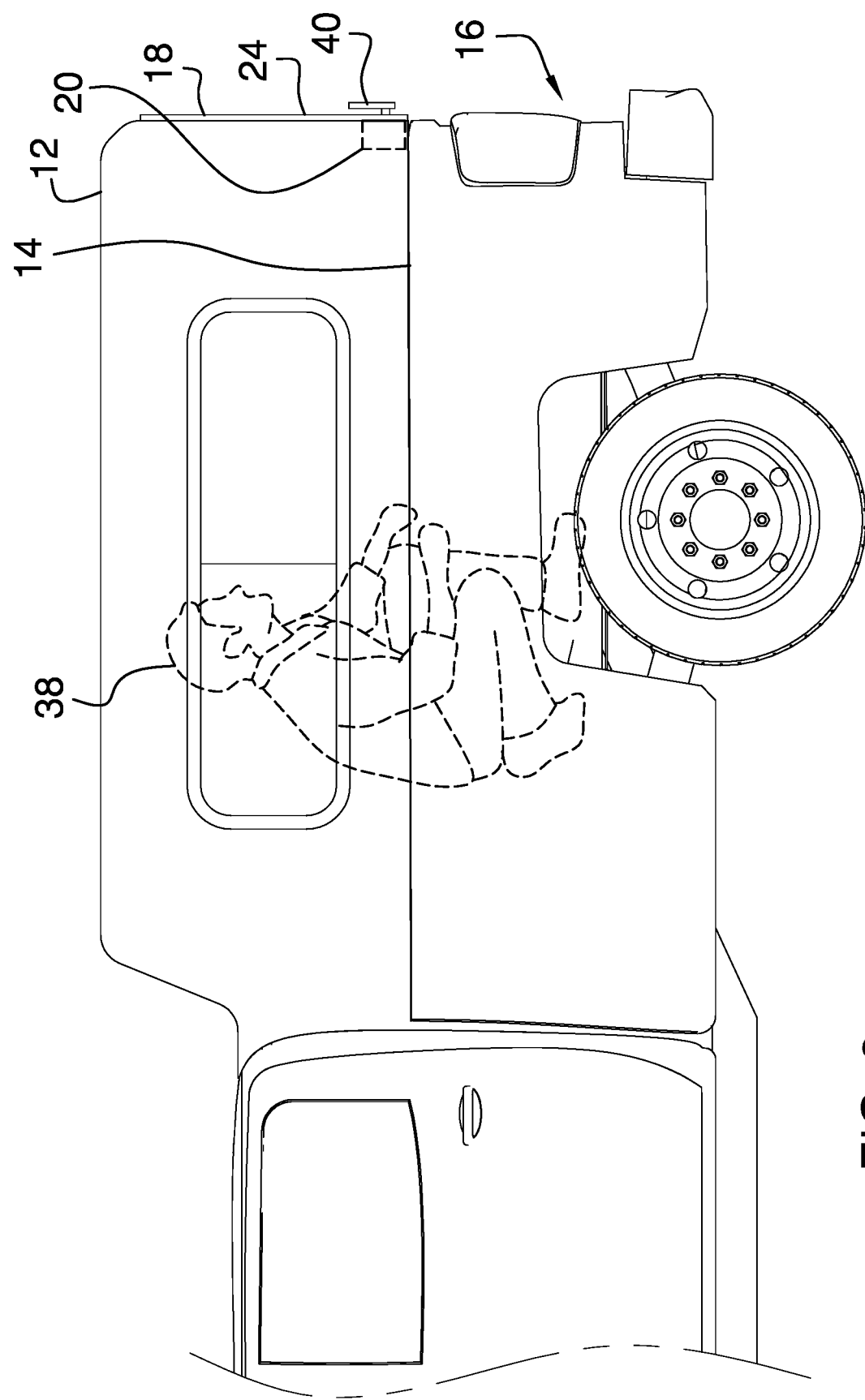
FIG. 8 is a perspective in-use view of an embodiment of the disclosure.

In an alternative embodiment 76 as is most clearly shown in FIG. 7, the outer wall 58 of the box 54 has a back side 78 and the back side 78 of the outer wall 58 has a pivot slot 80 which extends from a bottom edge 82 of the back side 78 of the outer wall 58 toward the top wall 56 of the box 54. Furthermore, the pivot slot 80 extends substantially between the first lateral side 62 and the second lateral side 64 of the outer wall 58 of the box 54. Additionally, each of the first rod slot 68 and the second rod slot 72 is positioned adjacent to the back side 78 of the outer wall 58 of the box 54. In this way the box 54 is structured to accommodate the pivot 34 of the locking mechanism 20 when the pivot 34 includes a support bracket and when the pair of rods 48 are positioned closer than 1.5 cm from the door 18.

In use, the box 54 is positioned on the pivot 34 when the occupant 38 is inside of the camper shell 12 and the door 18 is closed. In this way the box 54 inhibits the locking mechanism 20 from being urged into the unlocked condition with the exterior handle 40. Thus, the occupant 38 is protected from an intruder that might seek to rob or assault the occupant 38 while the occupant 38 is sleeping in the camper shell 12. The occupant 38 removes the box 54 from the locking mechanism 20 to facilitate the locking mechanism to be urged into the unlocked condition for opening the door 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A camper shell lock assembly for locking a camper shell handle from inside of the camper shell, said assembly comprising:
   a camper shell being installed on a bed of a pickup, said camper shell having a door, said door having a locking mechanism being movably integrated into said door, said locking mechanism being rotatable into a locked condition for inhibiting said door from being opened, said locking mechanism being rotatable into an unlocked condition to facilitate said door to be opened;
   a box being positionable over said locking mechanism thereby restricting motion of said locking mechanism, said box being comprised of a rigid material thereby facilitating said box to inhibit said locking mechanism from being rotated into said unlocked condition thereby inhibiting said door from being opened wherein said box is configured to inhibit a person outside of said camper shell from opening said door;
   said door has a front side, a rear side and a lower edge extending between said front side and said rear side, said lower edge resting upon a top edge of a tailgate of said bed of said pickup when said door is in a closed position, said camper shell having a rear wall, said door being hingedly disposed on said rear wall;
   said locking mechanism includes:
      a pivot being attached to said front side of said door, said pivot being aligned with said lower edge of said door;
      an interior handle being rotatably coupled to said pivot thereby facilitating said interior handle to be gripped by an occupant of said camper shell for urging said locking mechanism between said locked condition and said unlocked condition, said interior handle being oriented to extend upwardly with respect to said door when said locking mechanism is urged into said unlocked condition, said interior handle being oriented to extend laterally with respect to said door when said locking mechanism is urged into said locked condition;
      an exterior handle being pivotally attached to rear side of said door, said exterior handle being in mechanical communication with said pivot thereby facilitating said exterior handle to urge said locking mechanism between said locked condition and said unlocked condition;
      a cam being attached to said pivot such that said cam is rotated when said pivot is rotated, said cam having a pair of attachment points each being positioned on opposing ends of said cam with respect to each other; and
      a pair of rods, each of said rods having a connected end and a free end, said connected end of each of said rods being pivotally attached to a respective one of said attachment points on said cam, each of said rods extending along said front side of said door in opposite directions from each other, said connected end of each of said rods being urged toward each other when said locking mechanism is rotated into said unlocked condition thereby facilitating said free end of each of said rods to be displaced from a said rear wall of said camper shell to facilitate said door to be opened, said connected end of each of said rods being urged away from each other when said locking mechanism is rotated into said locked condition having said free end of each of said rods extending past said rear wall of said camper shell to inhibit said door from being opened; and
   wherein said box has a first rod slot and a second rod slot and a front side and a top wall, each of said first rod slot and said second rod slot insertably receiving a respective one of said rods of said locking mechanism when said box is positioned over said locking mechanism having said front back side of said box accommodating said pivot and said cam.

2. The assembly according to claim 1, wherein said box has a top wall and an outer wall extending downwardly from said top wall, said outer wall having a front side, a first lateral side and a second lateral side, a back side of said box being open, said first lateral side having a first rod slot extending from a bottom edge of said first lateral side toward said top wall, said first rod slot being positioned closer to said back side of said box than said front side of said outer wall, said second lateral side having a second rod slot extending from a bottom edge of said second lateral side toward said top wall, said second rod slot being positioned closer to said back side of said box than said front side of said outer wall.

3. The assembly according to claim 1, wherein said interior handle abuts said top wall of said box when said exterior handle is manipulated in the attempt to urge said locking mechanism into said unlocked condition thereby inhibiting said locking mechanism from being urged into said unlocked condition wherein said box is configured to inhibit a person outside of said camper shell from opening said door.

4. The assembly according to claim 1, further comprising a releasable mechanism being attachable between said pair of rods and said box when said box is positioned on said rods thereby inhibiting said box from being lifted upwardly from said rods.

5. A camper shell lock assembly for locking a camper shell handle from inside of the camper shell, said assembly comprising:
   a camper shell being installed on a bed of a pickup, said camper shell having a door, said door having a locking mechanism being movably integrated into said door, said door having a front side, a rear side and a lower edge extending between said front side and said rear side, said lower edge resting upon a top edge of a tailgate of said bed of said pickup when said door is in a closed position, said locking mechanism being rotatable into a locked condition for inhibiting said door from being opened, said locking mechanism being rotatable into an unlocked condition to facilitate said door to be opened, said camper shell having a rear wall, said door being hingedly disposed on said rear wall, said locking mechanism including:
- a pivot being attached to said front side of said door, said pivot being aligned with said lower edge of said door;
- an interior handle being rotatably coupled to said pivot thereby facilitating said interior handle to be gripped by an occupant of said camper shell for urging said locking mechanism between said locked condition and said unlocked condition, said interior handle being oriented to extend upwardly with respect to said door when said locking mechanism is urged into said unlocked condition, said interior handle being oriented to extend laterally with respect to said door when said locking mechanism is urged into said locked condition;
- an exterior handle being pivotally attached to rear side of said door, said exterior handle being in mechanical communication with said pivot thereby facilitating said exterior handle to urge said locking mechanism between said locked condition and said unlocked condition;
- a cam being attached to said pivot such that said cam is rotated when said pivot is rotated, said cam having a pair of attachment points each being positioned on opposing ends of said cam with respect to each other; and
- a pair of rods, each of said rods having a connected end and a free end, said connected end of each of said rods being pivotally attached to a respective one of said attachment points on said cam, each of said rods extending along said front side of said door in opposite directions from each other, said connected end of each of said rods being urged toward each other when said locking mechanism is rotated into said unlocked condition thereby facilitating said free end of each of said rods to be displaced from a rear wall of said camper shell to facilitate said door to be opened, said connected end of each of said rods being urged away from each other when said locking mechanism is rotated into said locked condition having said free end of each of said rods extending past said rear wall of said camper shell to inhibit said door from being opened;
a box being positionable over said locking mechanism thereby restricting motion of said locking mechanism, said box being comprised of a rigid material thereby facilitating said box to inhibit said locking mechanism from being rotated into said unlocked condition thereby inhibiting said door from being opened wherein said box is configured to inhibit a person outside of said camper shell from opening said door, said box having a top wall and an outer wall extending downwardly from said top wall, said outer wall having a front side, a first lateral side and a second lateral side, a back side of said box being open, said first lateral side having a first rod slot extending from a bottom edge of said first lateral side toward said top wall, said first rod slot being positioned closer to said back side of said box than said front side of said outer wall, said second lateral side having a second rod slot extending from a bottom edge of said second lateral side toward said top wall, said second rod slot being positioned closer to said back side of said box than said front side of said outer wall, each of said first rod slot and said second rod slot insertably receiving a respective one of said rods of said locking mechanism when said box is positioned over said locking mechanism having said back side of said box accommodating said pivot and said cam, said interior handle abutting said top wall of said box when said exterior handle is manipulated in the attempt to urge said locking mechanism into said unlocked condition thereby inhibiting said locking mechanism from being urged into said unlocked condition wherein said box is configured to inhibit a person outside of said camper shell from opening said door; and
a releasable mechanism being attachable between said pair of rods and said box when said box is positioned on said rods thereby inhibiting said box from being lifted upwardly from said rods.

6. The assembly according to claim 5, wherein said outer wall of said box has a back side, said back side of said outer wall having a pivot slot extending from a bottom edge of said back side of said outer wall toward said top wall of said box, said pivot slot extending substantially between said first lateral side and said second lateral side of said outer wall of said box.

7. The assembly according to claim 6, wherein each of said first rod slot and said second rod slot is positioned adjacent to said back side of said outer wall of said box.

* * * * *